United States Patent
Miner Urdampilleta

[11] Patent Number: 5,361,875
[45] Date of Patent: Nov. 8, 1994

[54] BRAKE FOR BICYCLES

[76] Inventor: Jose L. Miner Urdampilleta, Ronda 3 y 7, 20001 San Sebastian (Guipuzcoa), Spain

[21] Appl. No.: 200,581

[22] Filed: Feb. 22, 1994

Related U.S. Application Data

[63] Continuation of Ser. No. 910,566, Jul. 8, 1992, abandoned.

[30] Foreign Application Priority Data

Mar. 17, 1992 [ES] Spain .................................. 9200579

[51] Int. Cl.$^5$ .............................................. B62L 1/14
[52] U.S. Cl. .............................. 188/24.21; 188/24.12
[58] Field of Search ............... 188/24.12, 24.16, 24.19, 188/24.21, 24.13, 24.15

[56] References Cited

U.S. PATENT DOCUMENTS

| | | | |
|---|---|---|---|
| 4,765,443 | 8/1988 | Cunningham | 188/24.19 X |
| 4,838,387 | 6/1989 | Yoshigai | 188/24.21 |
| 5,058,450 | 10/1991 | Yoshigai | 188/24.21 X |

FOREIGN PATENT DOCUMENTS

| | | | |
|---|---|---|---|
| 0397940 | 11/1990 | European Pat. Off. | |
| 835450 | 12/1938 | France | 188/24.21 |
| 451118 | 5/1950 | Italy | 188/24.21 |
| 232014 | 12/1944 | Switzerland | 188/24.21 |
| 272457 | 3/1951 | Switzerland | 188/24.12 |
| 2088976 | 6/1982 | United Kingdom | 188/24.19 |

Primary Examiner—Robert J. Oberleitner
Assistant Examiner—Alfred Muratori
Attorney, Agent, or Firm—Wigman, Cohen, Leitner & Myers

[57] ABSTRACT

Brake for bicycles, for each wheel consisting of two independent levers, right and left, linked to the yoke in coincident positions and which are carriers for securing the traction cable and for the fitting of a brake shoe holder. Each lever includes at least two securing points for the brake shoe holder located at different distances from the linking shaft of the lever to the yoke. When the brakes are operated, these securing points describe arcs of different radii, which are located at different distances from the axis of the wheel. It allows wheels of different diameter to be fitted.

6 Claims, 3 Drawing Sheets

BRAKE FOR BICYCLES

This is a continuation of co-pending application Ser. No. 07/910,566 filed on Jul. 8, 1992 now abandoned.

This invention refers to a brake for bicycles designed in such a way that allows wheels of different diameter to be fitted to the same bicycle.

Brakes for bicycles are generally of two types: horseshoe and what are known as cantilever.

Horseshoe brakes are more commonly used and consist of arched levers, each carrying a brake shoe holder linked to each other, and including a single retarding spring by means of which the brake shoe holders are advanced or retarded when the brake cable is acted upon.

Cantilever system brakes, which give greater braking power, include two independent levers, right and left, each of which is linked to one of the arms or sheaths of the front and rear yoke in coincident points in the two arms or sheaths of each front and rear yoke of each bicycle, in line with shafts that are approximately perpendicular to the axis of the wheel. Each of these levers carries seatings or drilled holes for the screws for securing the brake traction and a brake shoe holder.

In both cases, for each wheel the brake includes two facing shoes whose position is determined by the diameter of the wheel, since these shoes must be positioned in such a way that when the brake is operated they act on the sides of the tire.

Since the position of the levers of the brakes is fixed in each bicycle in both brake systems, each bicycle is designed for a particular size of wheel and it cannot be varied since if the diameter of the wheel is changed the brake shoes would not be facing the tires.

The object of this invention is to develop a brake of the kind known as cantilever with independent levers right and left, designed in such a way that would allow the diameter of the wheel on the same bicycle to be varied considerably, which will allow the fitting of wheels with characteristics suited to the application that the bicycle is going to be put to at any moment.

In this way, the bicycle can be used for mountain riding, in the same way as what are called "mountain bikes", along forest or dirt tracks, as with bicycles called "hybrids", as a road bike and even as a racing bike. All that is needed is to fit the most suitable wheel in each case.

In other words, the invention allows the bike to become a convertible bike by means of a new system of brakes in which wheels of different diameter can be fitted.

As stated above, the invention's brake is of the type known as cantilever, consisting of two independent levers, right and left, on each wheel and characterized by the fact that each lever has at least two fastening points for the brake shoe holder, these points being located at different distances from the shaft linking the lever to the arm or sheath of the yoke. When the brakes are operated, these two fastening points will describe arcs of very different radius that are located at different distances from the axis of the wheel.

The distance that these securing points for the brake shoe holder lie from the axis of the wheel correspond to very different diameters of wheel.

In this way, the invention's brake will allow wheels with great differences in diameter to be used, which will correspond to different applications or types of bicycle.

Each of the levers of the brake that is the subject of the invention can, between the two fastening points mentioned above, have a series of intermediate fastening points for the brake shoe holders in such a way that will allow a bicycle to be mounted with more than two wheels of different diameters varying between two extreme sizes corresponding to the limit or extreme securing positions of the brake shoe holders.

The fastening points for the brake shoe holders may consist of drilled holes with their axis parallel to the linking shaft for the lever and located at different distances from that shaft.

As a variant method of carrying this out, each lever can have a slot whose ends are located at a different distance from the linking shaft of that lever. The brake shoe holder can be secured at any point along this slot, the ends of the slot determining two extreme securing positions for this brake shoe holder, which will correspond to the maximum and minimum diameter of wheel that can be accepted by the bicycle.

The different securing points for the brake shoe holder will be aligned with the linking point of the support, leaving the fixing head or screw of the cable located towards the outside of the yoke with respect to that alignment. The connection and fitting of this traction cable will be done in the same way as in traditional cantilever type brakes.

The lever for the invention's brakes can be arranged in an approximate Y shape, the linking point to the arm of the yoke being located in the central arm, while located in one of the side arms is the securing point for the traction cable and in the other side arm the fixing points for the brake shoe holder.

With the invention's brake system, each time that it is wished to change the size of the wheel of a bicycle, it will be sufficient to alter the position of the brake shoe holder, in the case of each lever containing a single holder.

Nevertheless, each of the brakes' levers, on both the front and rear wheels, can be fitted with two brake shoe holders located at points corresponding to the sizes of wheel that are most likely to be used more often. In this way, in order to transform a mountain bike into a road bike it will be necessary merely to change the wheels, in each case setting the diameter or size of the appropriate wheel.

The characteristics of the invention's brake and its advantages can be better understood with the following description, made with reference to the attached diagrams, in which a possible means of carrying this out is shown, and which is by way of being a non-restrictive example.

In the diagrams:

Figure 1:
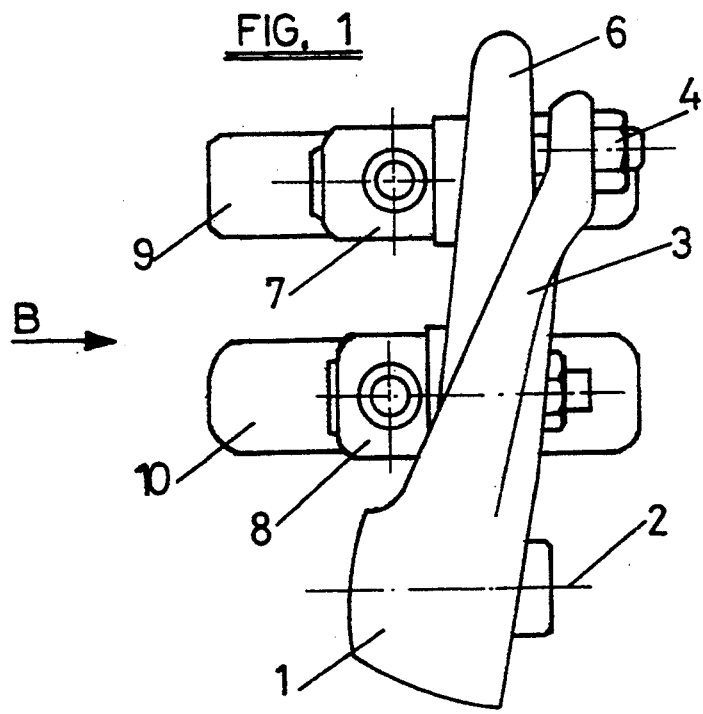
FIG. 1 is a side elevation of a lever designed in accordance with the invention, seen from direction A of FIG. 2.
Figure 2:
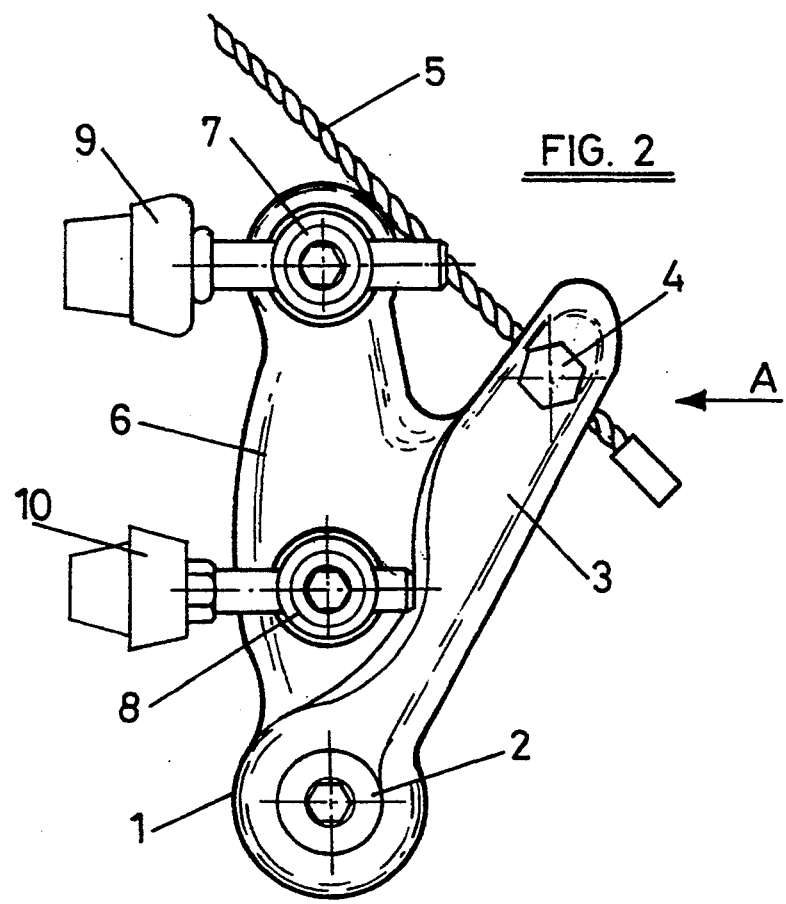
FIG. 2 is a front elevation of the same lever, seen according to direction B of FIG. 1.

FIGS. 1 and 2 show a lever for bicycle brakes, which takes on an approximate Y shape. Close to the end of the central arm 1, this lever has a drilled hole through which passes a screw 2 that will act as the shaft for linking the lever to the arm or sheath of the bicycle's yoke.

In one of the side arms, referenced with number 3, the lever has a drilled hole or seating in which is inserted a head or screw 4, to which will be fixed the brake's traction cable 5. Finally, in the other side arm, referenced with number 6, there are two securing points in which two more heads 7 and 8 are located for fitting the corresponding brake shoe holders 9 and 10.

The securing points for the heads 7 and 8 are located at different distances from the linking shaft 2 for the lever.

Figure 5:
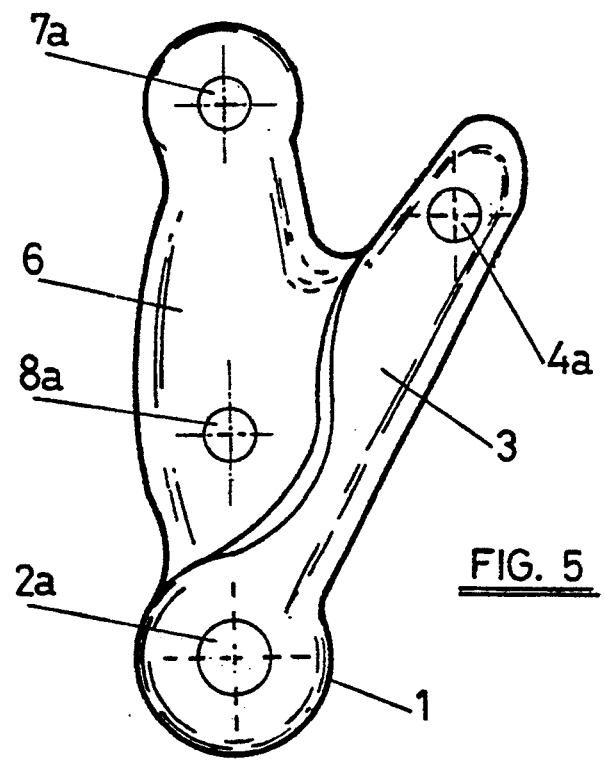
FIGS. 5 and 6 are similar views of FIG. 2, showing possible designs of the lever for the invention's brake.

FIG. 5 shows the drilled hole, referenced with number 2a, in which is inserted the shaft 2 that will act as the linking shaft for the lever. Number 4a references the drilled hole where the screw or head 4 for securing the traction cable 5 is inserted. Finally, references 7a and 8a refer to two more drilled holes in which the heads 7 and 8 for securing the brake shoe holders are inserted.

Figure 3:
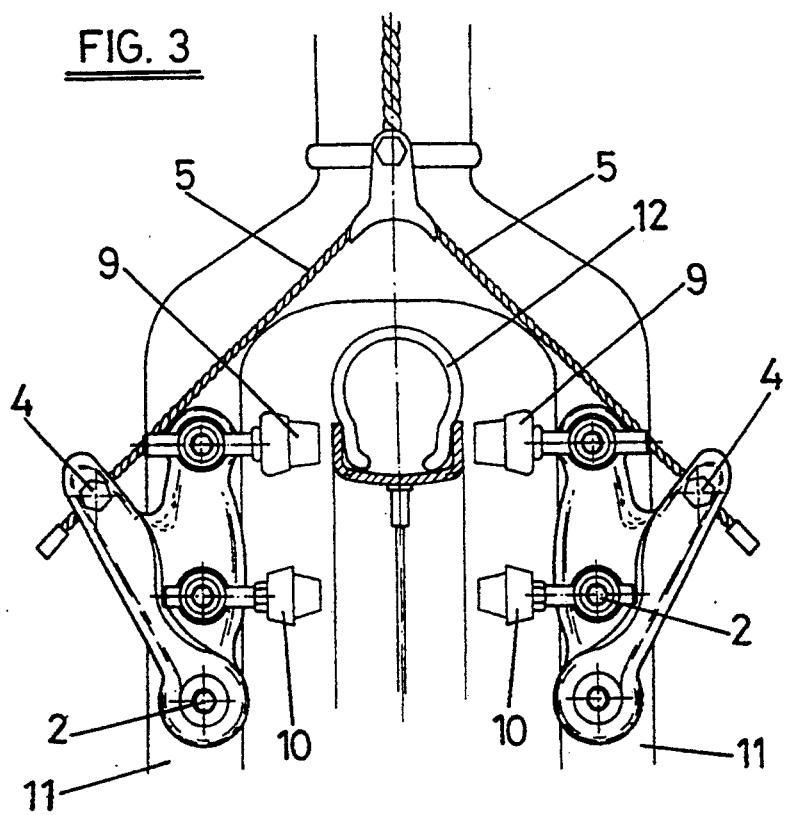
FIG. 3 is a partial front elevation of the front yoke of a bicycle, with the wheel shown in cross-section and including the invention's brakes.
Figure 4:
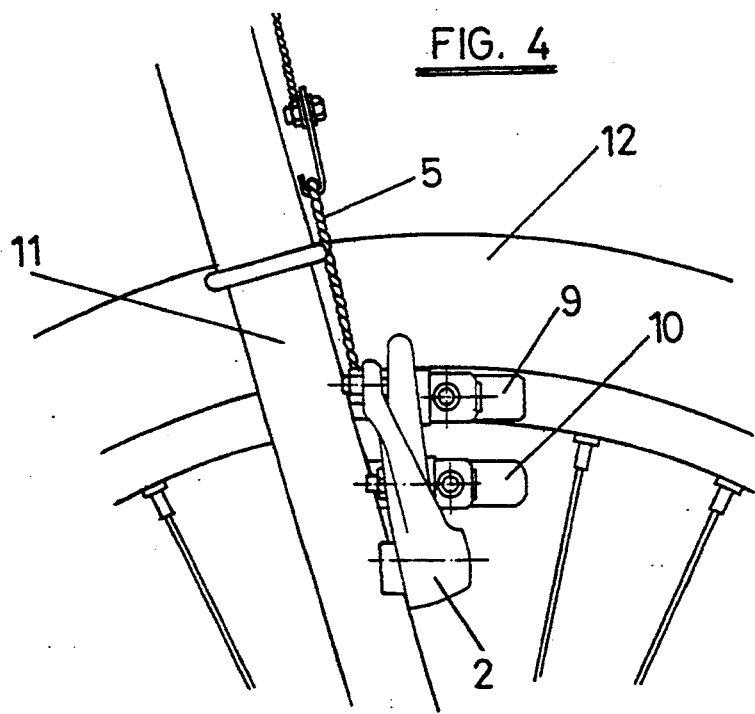
FIG. 4 is a partial side view of the yoke and wheels of FIG. 3.

FIGS. 3 and 4 show the front brakes of a bicycle wheel designed in accordance with this invention. The two brake levers, left and right, are both shaped in the form of a Y and are symmetric with regard to each other. They are linked via shafts 2 to the arms or sheaths 11 of the yoke at points situated at the same height. Connected in a familiar manner to screws or seatings 4 of the levers are the brake traction cables 5.

Each of the right and left levers can include two brake shoe holders 9 and 10 which will be located in a position facing each other. Each pair of facing brake shoe holders is located at a different distance from the axis of the wheel 12, in such a way that they can be adapted or coupled to the tire of different diameter wheels.

In the example shown in FIGS. 3 and 4, the wheel 12 corresponds to the maximum diameter that can be fitted in order for the shoes 9 to act on the corresponding tire. The shoes 10 will allow a smaller diameter wheel to be fitted.

Figure 6:
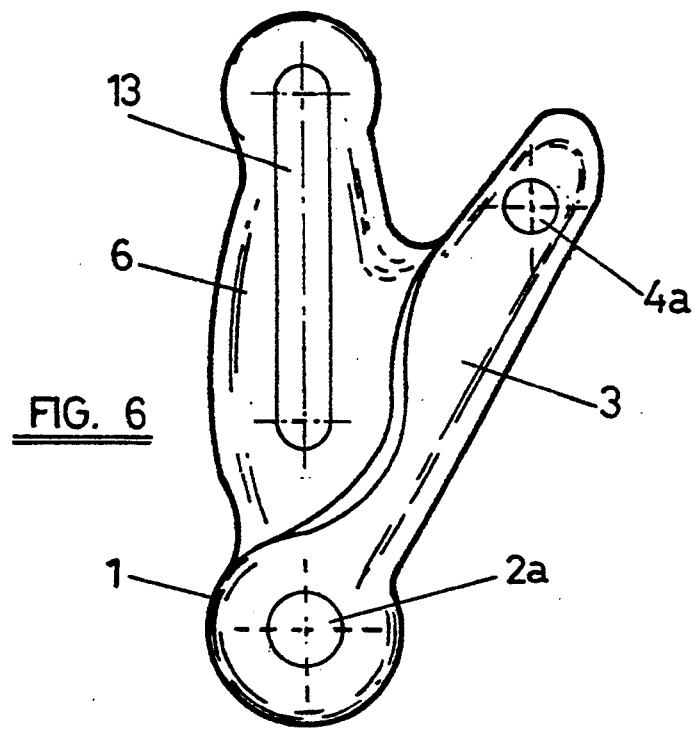

As shown in FIG. 6, the arm 6 of the lever can have a slot 13 whose ends correspond to the positions of the drilled holes 7a and 8a of FIG. 5. The brake shoe holders can be fitted at the desired point along this slot 13 in such a way that the bicycle can take a range of wheels of different diameter.

In any case, the different securing points for the shoes, whether they be the drilled holes 7a and 8a or the slot 13, are aligned with the drilled hole 2a, leaving the drilled hole or seating 4a located towards the outside in the fitting of the lever to a bicycle, as shown in FIG. 3.

As can be understood, the brake lever can take a different shape from the shown in the diagrams and nevertheless still fall within the scope of the invention provided that it meets the invention's characteristics as stated in the patent claims.

I claim:

1. A brake for bicycles, for each wheel consisting of two independent levers, right and left, that are linked to a yoke in coincident positions, one on an arm of the yoke, in line with linking shafts that are approximately perpendicular to the axis of an associated wheel, whose levers are carriers, each for a seating hole for a head for securing a brake traction cable and for a brake shoe holder, wherein each said lever has at least two securing points for simultaneously securing at least two brake shoe holders at different distances from the linking shaft of that lever to the arm of the yoke, whose securing points describe arcs of substantially different radii for corresponding to wheels having at least two different radii, when the brake is operated, each securing point being located at a different radial distance from the axis of the associated wheel.

2. The brake according to claim 1, wherein each said lever has, between the above-mentioned two securing points, a succession of intermediate securing points for the brake shoe holder.

3. The brake according to claim 2, wherein each said lever has a slot, whose ends are located at different distances from the linking shaft of that lever, along which slot the brake shoe holder can be fixed at any point for corresponding to wheels of varying radii, the ends of the slot determining the extreme securing positions of that brake shoe holder.

4. The brake according to claim 1, wherein said securing points consist of two spaced holes presented by each said lever, with axes parallel to the linking shaft of that lever and located at different distances from the said linking shaft.

5. The brake according to claim 1, said securing points of the brake shoe holder are aligned with each said lever's linking point, leaving the head for fixing the traction cable directed away from an outer yoke portion with respect to that alignment.

6. The brake according to claim 1, wherein the said levers take on an approximate Y shape, a linking point to the yoke being located in the central arm, while located in one of the side arms is one of said securing points for the traction cable and a plurality of fixing points in the other side arm for the brake shoe holder.

* * * * *